(12) United States Patent
Sant-Miller et al.

(10) Patent No.: US 10,931,706 B2
(45) Date of Patent: Feb. 23, 2021

(54) SYSTEM AND METHOD FOR DETECTING AND IDENTIFYING A CYBER-ATTACK ON A NETWORK

(71) Applicant: Booz Allen Hamilton Inc., McLean, VA (US)

(72) Inventors: Aaron Sant-Miller, Arlington, VA (US); Andre Tai Nguyen, Seattle, WA (US); William Hall Badart, Washington, DC (US); Sarah Olson, Arlington, VA (US); Jesse Shanahan, Herndon, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 16/814,689

(22) Filed: Mar. 10, 2020

(65) Prior Publication Data
US 2020/0304535 A1    Sep. 24, 2020

Related U.S. Application Data

(60) Provisional application No. 62/821,251, filed on Mar. 20, 2019.

(51) Int. Cl.
*H04L 29/06* (2006.01)
*G06N 20/00* (2019.01)

(52) U.S. Cl.
CPC ......... *H04L 63/1433* (2013.01); *G06N 20/00* (2019.01); *H04L 63/1416* (2013.01); *H04L 63/1425* (2013.01); *H04L 63/1441* (2013.01)

(58) Field of Classification Search
CPC ......... G06F 21/55; G06F 17/30; H04L 29/06; H04L 63/1433; H04L 63/1416;
(Continued)

(56) References Cited

U.S. PATENT DOCUMENTS 9,177,139 B2 *  11/2015  Hull Roskos ...... G05B 23/0235
9,537,879 B2 *   1/2017  Blackwell ............ G06F 21/554
(Continued)

OTHER PUBLICATIONS

Blundell, Charles, et al., "Weight Uncertainty in Neural Networks," Proceedings of the 32nd International Conference on Machine Learning, Lille, France, 2015. JMLR: W&CP vol. 37, Copyright 2015 by the author(s), arXiv:1505.05424v2 [stat.ML], 10 pages, (May 21, 2015).
(Continued)

*Primary Examiner* — Thanhnga B Troung
(74) *Attorney, Agent, or Firm* — Buchanan Ingersoll & Rooney PC

(57) ABSTRACT

A method for detecting and/or identifying a cyber-attack on a network can include segmenting the network using a segmentation method with machine learning to generate one or more network segments; assigning a score to a data point within each network segment based on a presence or absence of an identified anomalous behavior of the data point; analyzing network data flow, via behavioral modeling, to provide a context for characterizing the anomalous behavior; combining, via a reinforcement learning agent, outputs of the segmentation method with behavioral modelling and assigned score to detect and/or identify a cyber-attack; providing one or more alerts to an analyst; receiving an analyst assessment of an effectiveness of the detection and/or identification; and providing the analyst assessment as feedback to the reinforcement learning agent.

20 Claims, 2 Drawing Sheets

(58) Field of Classification Search
CPC ... H04L 63/1425; H04L 63/1441; G06N 3/08; G06N 20/00; G01R 21/00
See application file for complete search history.

(56) References Cited

U.S. PATENT DOCUMENTS

| | | | | |
|---|---|---|---|---|
| 2005/0050334 | A1* | 3/2005 | Liang | H04L 63/145 713/188 |
| 2015/0326600 | A1* | 11/2015 | Karabatis | H04L 63/1433 726/25 |
| 2017/0063905 | A1* | 3/2017 | Muddu | G06F 16/24578 |
| 2019/0190926 | A1* | 6/2019 | Choi | G06N 3/08 |

OTHER PUBLICATIONS

Ernst, Damien, et al., "Tree-Based Batch Mode Reinforcement Learning," Journal of Machine Learning Research 6, pp. 503-556 (2005).

Pokrajac, David, et al., "Incremental Local Outlier Detection for Data Streams," DOI: 10.1109/CIDM.2007.368917, Source: IEEE Xplore, Research Gate, Conference Paper, 13 pages, (Jan. 2007).

Radford, Benjamin J., et al., "Network Traffic Anomaly Detection Using Recurrent Neural Networks," research funded by Defense Advanced Research Projects Agency (DARPA), arXiv:1803.10769v1 [cs.CY], 7 pages, (Mar. 28, 2018).

Wang, Gang, et al., "Unsupervised Clickstream Clustering for User Behavior Analysis," CHI 2016, May 7-12, 2016, San Jose, California, USA, Copyright © 2016 ACM ISBN 978-1-4503-3362-7/16/05, doi.org/10.1145/2858036.2858107, 12 pages, (2016).

Yao, Haiqing, et al., "An Incremental Local Outlier Detection Method in the Data Stream," Applied Sciences, 8, 1248, doi:10.3390/app8081248, 19 pages, (Jul. 28, 2018).

Bayer et al., "Scalable, Behavior-Based Malware Clustering," Supported by the European Commission through project FP7-ICT-216026-WOMBAT, by FITIT through the Pathfinder project, by FWF through the Web-Defense project (No. P18764) and by Secure Business Austria, 18 pages; Jan. 2009.

Veeramachaneni et al., "AI^2: Training a big data machine to defend," CSAIL, MIT Cambridge, MA, PattemEx, San Jose, CA, 2016 IEEE International Conference on Intelligent Data and Security (IDS), 13 pages; Apr. 2016.

* cited by examiner

SYSTEM AND METHOD FOR DETECTING AND IDENTIFYING A CYBER-ATTACK ON A NETWORK

FIELD

Aspects of the present disclosure provide methods and systems for detecting and/or identifying a cyber-attack on a network.

BACKGROUND INFORMATION

Almost all networks, regardless of physical or logical architecture encounter information security challenges. In some cases, these challenges are even more pronounced as cyber-attacks on networks are becoming more complex than ever before and adversaries are becoming increasingly sophisticated and creative in how they exploit cyber vulnerabilities.

Known techniques for thwarting cyber-attacks that compromise a network involve penetration testing and network defense analysis. These techniques include cyber analysts manually sifting through massive amounts of historical data and known attack codes to emulate specific cyber threats and/or cyber defenses. Therefore, these known techniques are expensive and time-consuming processes, and result in cyber defenses that are limited merely to the knowledge and resources of the cyber analysts. For example, when cyber analysts are aware of previously detected attack signatures, they create rules that merely prevent the same type of event from occurring again.

Among the many disadvantages of these known techniques are that they operate too slowly and do not scale with the shortage of cyber talent. This reactive approach is what you see in a lot of relatively ineffective cyber-related products, tools, and technologies (e.g., firewalls), which is reflective of the statistic that the average cyber intrusion is detected no earlier than 200 days after the intrusion.

There has been a recent push to incorporate Machine Learning/Artificial Intelligence techniques into cyber products, tools, and technologies, however, these techniques consistently produce high false positive rates. Some examples of known techniques include the following nine disclosures, all of which are hereby incorporated herein by reference in their entireties:
1) An incremental local outlier detection method in the data stream (Yao et al 2018);
2) Incremental local outlier detection for data streams (Pokrajac and Lazaryevic 2007);
3) https://arxiv.org/pdf/1803.10769.pdf;
4) https://www.cs.ucsb.edu/~chris/research/doc/ndss09_cluster.pdf;
5) https://www.cs.ucsb.edu/~ravenben/publications/pdf/clickstream-chi16.pdf;
6) https://arxiv.org/pdf/1505.05424.pdf;
7) https://people.csail.mit.edu/kalyan/AI2_Paper.pdf;
8) https://www.patternex.com/;
9) http://www.jmlr.org/papers/volume6/ernst05a/ernst05a.pdf.

Machine Learning/Artificial Intelligence (AI) for anomaly detection in cyber security products, tools, and technologies is not generally effective because it monitors human activity on networks. Human activity is inherently anomalous which means, by its nature, training to anticipate or detect human behavior traditionally has been a difficult challenge. Also, when an effective Machine Learning technique is developed and the cyber security model is trained and deployed, the model is already out of date. Advancement in cyber threats is moving so fast and on such a large scale that batch training, pre-training, or transfer learning of cyber security defenses into a cyber security model is generally ineffective.

Additionally, known products that attempt to automate techniques for penetration testing and network defense analysis are limited in their capabilities, only covering select scenarios instead of covering more comprehensive, complex, adversarial behaviors and tactics. These techniques are ineffective and inaccurate, as they can generate too many false positives and fail to differentiate what is natural anomalous human behavior from adversarial actions and novel attack vectors. This presents many technical challenges regarding the effectiveness of such techniques. Aspects of the present disclosure provide technical solutions to address these technical challenges.

SUMMARY

A method for detecting and/or identifying a cyber-attack on a network is disclosed. The method includes segmenting the network using a segmentation method with machine learning to generate one or more network segments; assigning a score to at least one data point within each network segment based on the presence or absence of an identified anomalous behavior of the data point; analyzing network data flow, via behavioral modeling, to provide a context for characterizing an identified anomalous behavior; combining, via a reinforcement learning agent, outputs of the segmentation method with the behavioral modeling and assigned score, to detect and/or identify a cyber-attack; providing one or more alerts to an analyst when a cyber-attack is detected and/or identified; receiving an analyst assessment of an effectiveness of the detection and/or identification the cyber-attack; and providing the analyst assessment as feedback to the reinforcement learning agent, the feedback including measures that impact the effectiveness of detection and/or identification.

A system for detecting and/or identifying a cyber-attack on a network is disclosed. The system includes a segmenting module configured to segment a network using machine learning to generate one or more network segments; a scoring module configured to assign a score to at least one data point within at least one network segment based on a presence or absence of an identified anomalous behavior of the data point; an analyzing module configured to analyze network data flow, via behavioral modeling, to provide a context for characterizing an identified anomalous behavior; a reinforcement module configured to combine via a reinforcement learning agent, outputs of the segmenting module, the scoring module, and the analyzing module to detect and/or identify a cyber-attack; and a feedback module configured receive an analyst assessment of an effectiveness of the detection and/or identification of the cyber-attack, and provide feedback to the reinforcement module based on the assessment, wherein the feedback is used to impact the effectiveness of the system.

BRIEF DESCRIPTION OF THE DRAWINGS

Other objects and advantages of the present disclosure will be realized from the following description of exemplary preferred embodiments when read in conjunction with the drawings set forth herein, wherein.

DETAILED DESCRIPTION

Aspects of the present disclosure provide technical solutions to the aforementioned technical problems. These solutions can be 1) adaptive—continuously learning what is truly adversarial on a network, 2) unsupervised—minimizing any model training bias or stagnation, 3) anomaly-detection informed—detecting zero-day attacks (e.g., never seen before signatures), 4) cyber-informed—providing context and characterization of anomalous behavior so that alerts are not communicated in a vacuum and are presented to an analyst with relevant, available information in a domain-appropriate manner or otherwise output to storage or other means for appropriate analysis, use or action, 5) real time or near real-time—exploiting high performance computing solutions, for example graphics processing units (GPUs), to detect anomalous behavior and adversarial attacks at network speed, and 6) self-sufficient—capable of learning and operating independently using analyst or other input with minimal human machine learning support and algorithmic adjustments.

Figure 1:
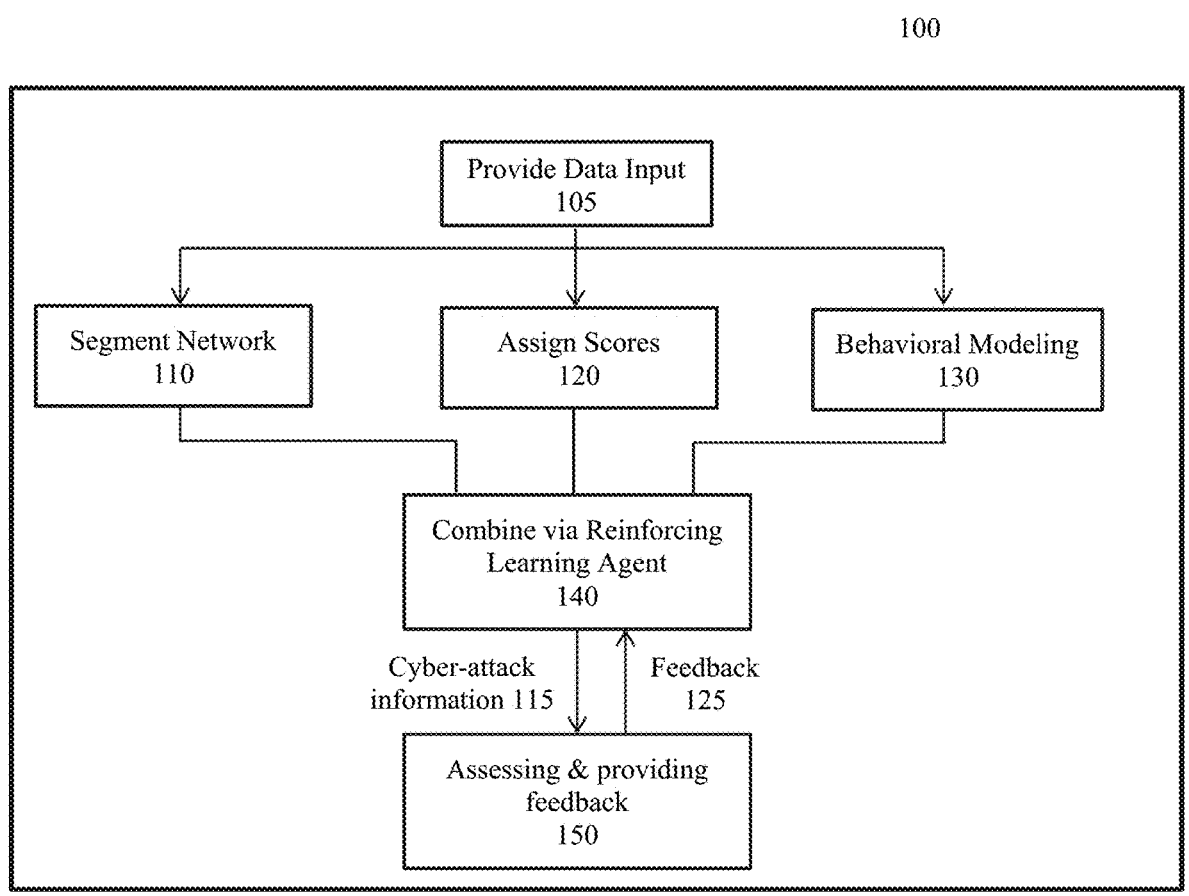
FIG. 1 shows an exemplary flow chart of a method for detecting and identifying a cyber-attack on a network.

FIG. 1 shows an exemplary method 100 for detecting and/or identifying a cyber-attack on a network. A network, as used herein, can be a computer network, a data network, or a digital telecommunications network, or any combination thereof. The network can allow nodes operating in the network to share resources with each other using connections (data links) between nodes. These data links can be established over cable media (e.g., wires or optic cables) or wirelessly (e.g., WiFi).

A cyber-attack, as referenced herein, can, for example, be any attempt to expose, alter, disable, destroy, steal or gain unauthorized access to or make unauthorized use of any data, device, network, or component of a network. A cyber-attack can, for example, be any type of offensive maneuver that targets computer information systems, infrastructures, computer networks, industrial equipment, medical devices, personal computer devices, other electronic devices utilizing electronic data or electronic command and control systems, etc. Cyber-attacks can steal, alter, control, or destroy a specified target by hacking into a susceptible system, ranging from installing spyware on a personal computer to attempting to destroy the infrastructure of entire nations.

Examples of cyber-attacks can include computer and network surveillance, wiretapping, fiber tapping, port scanning, idle scanning, keystroke logging, screen scraping, backdoor access, denial-of-service attacks, spoofing, man-in-the-middle attacks, man-in-the-browser attacks, ARP poisoning, ping flooding, ping of death, Smurf attacks, buffer overflow, heap overflow, stack overflow, or format string attacks.

In an exemplary embodiment, the method 100 can include a step 110 of segmenting the network using a segmentation method with machine learning to generate one or more network segments. The segmenting step 110 can include a process of dividing the network into any desired number of subnetworks, each being a network segment. Each network segment can be a portion of a network that is separated from the rest of the network by, for example, a device such as a repeater, hub, bridge, switch, router, or virtual segmentation. A network segment can also be, for example, a device (e.g., a printer, storage, etc.), a communication channel, or another system on or connected to the network. Each network segment can have a vector space of associated network characteristics (e.g., connection, topology, protocol, architecture, etc.).

In an exemplary embodiment, each vector space can contain zero, one or multiple computers or other hosts. Each vector space can support an access protocol and a desired bandwidth. Each vector space can have its own hub or switch, and IP addresses can, for example, be assigned to each segment.

In an exemplary embodiment, a machine learning (ML) algorithm, such as a density-based clustering method or another suitable algorithm, can be used for the segmenting step 110. Various methods can be used for training and building the machine learning algorithm used for segmentation. One such exemplary method is described in U.S. Pat. No. 6,327,581, assigned on its face to Microsoft, which is incorporated in its entirety by reference, and which describes building or training a support vector machine (SVM) as trainable object classifier relative to other known classifiers such as, for example, neural networks or Bayesian classifiers.

In an exemplary embodiment, the density-based clustering method can use network traffic information (included in data input 105), network host information, network usage information, network structure information, among others to group data as part of the segmenting step 110. For example, the density-based clustering method can create network segments based on network traffic above or below a specified threshold (e.g., network traffic above 10k bits/sec can be classified as segment 1, network traffic between or equal to 5k and 10k bits/sec can be classified as segment 2, and network traffic below 5k bits/sec can classified as segment 3). Similarly, the clustering method can create network segments based on the number of network hosts in a network segment (e.g., number of hosts above 5 can be classified as segment 1, number of hosts between or equal to 3 and 5 can be classified as segment 2, number of hosts below 3 can be classified as segment 3). The clustering method can, for example, use a range of cyber log data from network and endpoint sensors (e.g., host information, network packet characteristics, endpoint process information, and user activity measures). Those skilled in the art will recognize that any of a wide array of information inputs can be used as desired.

In an exemplary embodiment, the method 100 can include a step 120 of assigning a score to at least one data point (included in data input 105) within each network segment based on an anomalous behavior of the data point. The anomalous behavior can be made up of a series of steps or events involved in committing a cyber-attack.

The anomalous behavior can be identified by establishing a baseline of normal behavior of a data point and then continuously monitoring the network for unusual events or trends related to the data point. A deviation from the baseline behavior can indicate an anomalous behavior related to that data point, and the extent of deviation can indicate the extent of the anomalous behavior.

In an exemplary embodiment, the score can be based on the extent to which the associated anomalous behavior related to the data point can affect the network segment and the network, causing various harmful impacts. For example, identifying a data point that is malware for a single node of a network would have a lower score than a data point that is malware for multiple nodes. Identifying a data point that is malware for all the network nodes may have the highest score. Alternatively, the score can be based on the type of anomalous behavior. For example, identifying malware can have a higher anomalous score than identifying a malicious domain because malware can cause greater harm to the network. The score can also be based on a combination of the foregoing harmful impacts. The anomalous behavior can, of course, include any network activity that can be detected and identified as potentially harmful to network operation or effectiveness.

In an exemplary embodiment, the method 100 can include a step 130 of analyzing network data flow, via behavioral modeling, to provide a context for characterizing the anomalous behavior. Network data flow (forms part of data input 105) can include one or more network packets, which can include control information and user data (payload). Control information, which can be found in packet headers and trailers, provides data for delivering the payload, for example: source and destination network addresses, error detection codes, and sequencing information.

The step 130 of analyzing can be performed by monitoring network data flow in light of historic behavior for additional context. To establish the historic behavior, data can be collected, which can include behavioral indicators associated with the who (e.g., a user or a process), the what (e.g., a file type), the where (e.g., file metadata), the when (e.g., system time), and/or the how (e.g., through which process a file was accessed) the data is accessed by the given executable.

After establishing the historic behavior, various behavioral indicators of the data flow can then be processed for a complete analysis of the context of network data flow to characterize the anomalous behavior (e.g., malware) based on certain commonalities. For example, commonalities among various malware can include one or more of (1) the malware executes using resources allocated by, and shared with, the compromised system, (2) the malware includes at least one persistence mechanism that allows the malicious code to survive reboot and power events, and allows for resident execution within user or kernel space, or (3) the malware includes some form of a Command and Control (C&C) channel through which to receive updates, instructions and for exfiltration of stolen data. These three commonalities shared among various malware can be an exemplary basis for creating a behavioral model for analyzing malware.

In an exemplary embodiment, the method 100 can include a step 140 of combining, via reinforcement learning, outputs of the segmentation method with the behavioral modelling and assigned score (i.e., previously described steps of segmenting 110, assigning 120, and analyzing 130) to detect and/or identify a cyber-attack 115. The combining step 140 can be performed by taking a weighted arithmetic mean of the outputs of the segmenting 110, assigning 120, and analyzing 130 steps. For example, the output from the step 120 can be assigned a weight of 80% and the outputs from steps 110 and 130 can be assigned a weight of 10% each to detect and identify the cyber-attack 115. Alternatively, the outputs from the steps 110, 120 and 130 can be assigned equal weights. Of course, any known method can be used to combining the outputs.

For purposes of the combining step 140, the output of step 110 can include information that affects the scores assigned to various network segments based on their importance to the network. For example, if a segment has critical hardware, or the data flow is critical (e.g., hardware requires the input to provide a designated output) in that segment, then it could be assigned a higher score. The output of step 120 can include information indicating a severity of the anomalous behavior. For example, a Trojan horse can have a higher score than an Adware. The output of step 130 can include information indicating the amount and/or quality of data flow through a network segment. For example, if an amount of network data flow at time t with a network segment is higher than an amount at time t+10 seconds, then network data flow at time t can have a higher score. Such scores can thus be a measure of the importance of a given measured characteristic's value relative to the presence and/or importance of a cyber-attack.

In an exemplary embodiment, the method can include providing one or more alerts to an analyst when a cyber-attack 115 is detected and/or identified, wherein the alert(s) can be outputted via a physical data interface, such as a display, computer interface or other physical device. The alerts can also be stored in a memory. The detection and/or identification of the cyber-attack 115 can also automatically quarantine a section of the network, or shut down the network completely or any portion thereof based on, for example, the type and/or severity of the cyber-attack.

A reinforcement learning agent, can interact with its environment (e.g., the network) in discrete time steps. At each time t, the agent can receive an output of the steps of segmenting 110, assigning 120, and analyzing 130. The output can indicate whether a target was achieved (a reward) based on the agent's previous instructions (e.g., at time t−10 seconds), or whether a target was missed (a regret). The goal of a reinforcement learning agent is to collect as much reward as possible.

For example, for a certain kind of malware (e.g., an Adware with severity score between 1/10-3/10) that is considered (e.g., designated by a network administrator) to be harmless, the defensive action can be to merely flag the malware without quarantining a network segment associated with the malware. Whereas, for another kind of malware (e.g., a Trojan Horse with severity score between 7/10-10/10) that is considered harmful, the defensive action can be to quarantine a network segment associated with the malware.

In an exemplary embodiment, the method 100 can include a step 150 of receiving, for example from an analyst, an assessment of the effectiveness of detecting and/or identifying the cyber-attack 115, and providing the analyst assessment as feedback 125 to the reinforcement learning agent based on the assessing 150, the feedback 125 including measures to address or impact on, for example, improve or maintain, the effectiveness of the detection and/or identification. Over time, the reinforcement learning agent can get smarter (e.g., more effective and/or efficient in detecting and/or identifying cyber-attacks) by incorporating the feedback 125. The analyst feedback can, for example, be human generated inputs received via a system GUI, or it can be an automated, computer programmed analyst inputs that for example, are produced by comparing data against pre-established thresholds or templates to detect and identify anomalous behavior, or it can be a combination of the two (i.e., human and automated analysts providing feedback analytics).

For example, if an alert 115 is raised for an Adware (e.g., severity score between 1/10-3/10) which is considered harmless, the analyst can provide feedback 125 to the system via a general user interface for indicating that in the future, an alert 115 should not be raised for such an Adware. Similarly, if an alert 115 is not raised for a Trojan Horse (e.g., severity score between 6/10-8/10) which is considered very harmful, the analyst can provide feedback 125 indicating that in the future, an alert 115 should always be raised for such a Trojan Horse. The analyst can be a human user, or a programmed computer, or a combination of a human and a computer handling various aspects.

Figure 2:
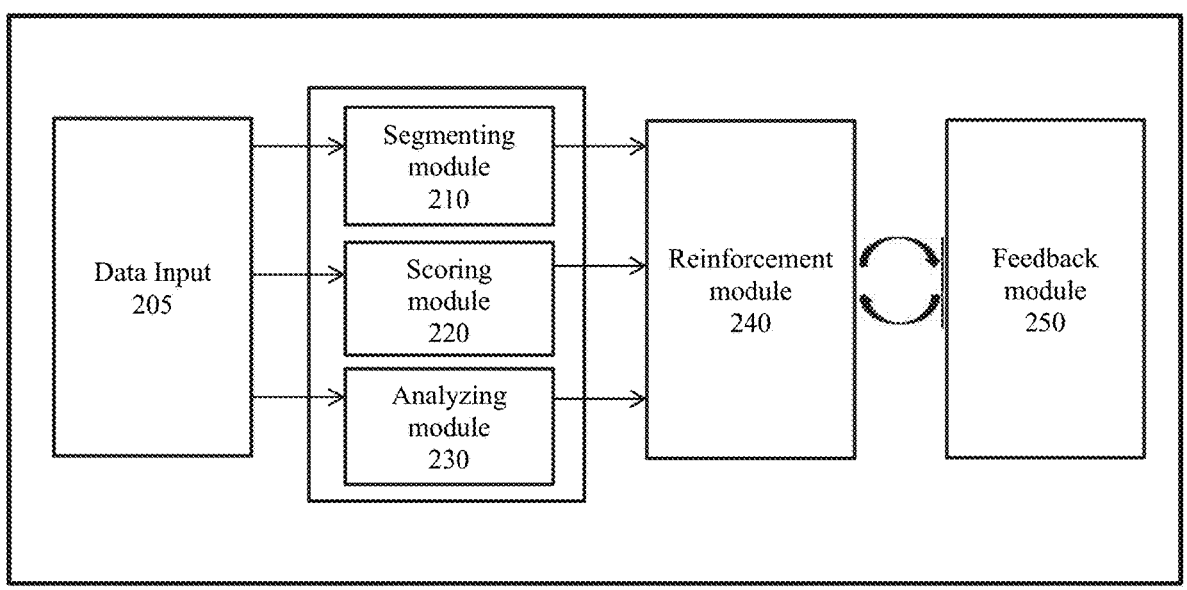
FIG. 2 shows an exemplary block diagram of a system for detecting and identifying a cyber-attack on a network.

FIG. 2 illustrates an exemplary system 200 for detecting and/or identifying a cyber-attack on a network. The system can include a segmenting module 210 configured to segment a network using machine learning to generate one or more network segments. Exemplary functional aspects of the segmenting module 210 relate to the previously described segmenting step 110.

In an exemplary embodiment, the system 200 can include a scoring module 220 configured to assign a score to at least one data point (included in data input 205) within each network segment based on a presence of an identified anomalous behavior of the data point. Exemplary functional aspects of the scoring module 220 relate to the previously described score assigning step 120.

In an exemplary embodiment, the system 200 can include an analyzing module 230 configured to analyze network data flow, via, for example, behavioral modeling, to provide a context for characterizing anomalous behavior. Exemplary functional aspects of the analyzing module 230 relate to the previously described behavioral modeling step 130.

In an exemplary embodiment, the system 200 can include a reinforcement module 240 configured to combine via a reinforcement learning agent, outputs of the segmenting module 210, the scoring module 220, and the analyzing module 230 to detect and identify a cyber-attack. Exemplary functional aspects of the reinforcement module 240 relate to the previously described reinforcing step 140.

In an exemplary embodiment, the system 200 can include a feedback module 250 configured to receive an analyst assessment of the effectiveness of detecting and/or identifying the cyber-attack, and providing analyst feedback via a general user interface to the reinforcement module 240 based on the assessment, the feedback including measures to address (e.g., improve or maintain) the effectiveness. Exemplary functional aspects of the reinforcement module 250 relate to the previously described assessing step 150.

A person having ordinary skill in the art would appreciate that embodiments of the disclosed subject matter, such as each of the modules illustrated in FIG. 2 can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory, or firmware and/or software within a single or multi-processor system. The entire solution can also be built and designed for execution on high-performance computing systems (e.g., GPUs, etc.) to provide higher speed for network processing and alerting.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A system, as used herein, can be in combination with one or more nodes, wherein the system resides in the one or more nodes. A node can be configured to interface or contain one or more components of the systems described herein.

A hardware processor, as used herein, can be a special purpose or a general purpose processor device. The hardware processor device can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the exemplary methods, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit (e.g., LCD screen, plasma screen, LED screen, DLP screen, CRT screen, etc.).

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

What is claimed is:

1. A method for detecting a cyber-attack on a network, the method comprising:
   segmenting the network using a segmentation method with machine learning to generate one or more network segments, wherein the segmentation method is a density-based clustering method;
   assigning a score to at least one data point within each network segment based on the presence or absence of an identified anomalous behavior of the data point;
   analyzing network data flow, via behavioral modeling, to provide a context for characterizing an identified anomalous behavior;
   combining, via a reinforcement learning agent, outputs of the segmentation with the behavioral modelling and assigned score to detect a cyber-attack;
   providing one or more alerts to an analyst when a cyber-attack is detected;
   receiving an analyst assessment of an effectiveness of the detection of the cyber-attack; and
   providing the analyst assessment as feedback to the reinforcement learning agent, the feedback including measures that impact on the effectiveness of the detection.

2. The method of claim 1, comprising:
   iterating the steps of segmenting, assigning, analyzing, combining, providing, assessing, and providing feedback to improve the effectiveness of the detection, and alerts.

3. The method according to claim 1, wherein the feedback is a human-generated input.

4. The method according to claim 1, wherein the feedback is from a computer programmed to assess the detection, and alerts of a cyber-attack and provide feedback based on the assessment.

5. The method according to claim 1, wherein the analyst is a combination of a human analyst and a computer programmed analyst to assess the detection, and alerts of a cyber-attack, such that both the user and the computer analyst assess various aspects of the cyber-attack.

6. The method according to claim 1, wherein the feedback is selected to improve the effectiveness.

7. The method of claim 1, wherein the one or more network segments are based on a network traffic threshold.

8. The method of claim 1, wherein the one or more network segments are based on a number of network hosts in the one or more network segments.

9. The method of claim 1, wherein the identified anomalous behavior of the data point is identified by:
   establishing a baseline of normal behavior of the data point; and
   monitor the network for unusual events or trends related to the data point.

10. The method of claim 1, wherein the score is based on the extent of the anomalous behavior can affect the network and the one or more network segments.

11. The method of claim 1, wherein the score is based on an anomalous behavior type.

12. The method of claim 1, wherein analyzing network data flow includes:
    collecting behavioral indicators associated with the data flow;
    monitoring the data flow in the network based the behavioral indicators; and
    identifying the cyber-attack based on the behavioral indicators of the data flow.

13. The method of claim 1, wherein combining the outputs of the segmentation with the behavioral modelling and assigned score includes:
    assigning a weight to each of the outputs of the segmentation; and
    calculating a weighted arithmetic mean of the outputs.

14. The method of claim 13, wherein assigning a weight to each of the outputs of the segmentation is based in the importance of the one or more segments to the network.

15. A system for detecting a cyber-attack on a network, the system comprising:
    a segmenting module configured to segment a network using machine learning algorithm to generate one or more network segments, wherein the machine learning algorithm is a density-based clustering algorithm;
    a scoring module configured to assign a score to at least one data point within at least one network segment based on a presence or absence of an identified anomalous behavior of the data point;
    an analyzing module configured to analyze network data flow, via behavioral modeling, to provide a context for characterizing identified anomalous behavior;
    a reinforcement module configured to combine via a reinforcement learning agent, outputs of the segmenting module, the scoring module, and the analyzing module to detect a cyber-attack; and
    a feedback module configured to receive an analyst assessment of an the effectiveness of the detection of the cyber-attack, and provide feedback to the reinforcement module based on the assessment, wherein the feedback is selected to impact on the effectiveness.

16. The system of claim 15, wherein
    the feedback is a human-generated input.

17. The system of claim 15, wherein
    the feedback is a computer programmed to assess the detection, and alerts of the cyber-attack and provide feedback based on such assessment.

18. The system of claim 15, wherein
    the analyst is a combination of a human analyst and a computer programmed analyst to assess the detection, and alerts of the cyber-attack, such that both the user and the computer analysts assess various aspects of the cyber-attack.

19. The system of claim 15, wherein the feedback is selected to improve the effectiveness.

20. The system of claim 15, wherein the analyzing module is configured to analyze network data flow, via behavioral modeling, to provide a context for characterizing identified anomalous behavior includes:
    collecting behavioral indicators associated with the data flow;

monitoring the data flow in the network based the behavioral indicators; and identifying the cyber-attack based on the behavioral indicators of the data flow.

\* \* \* \* \*